(12) United States Patent
Achiwa et al.

(10) Patent No.: US 7,047,261 B2
(45) Date of Patent: May 16, 2006

(54) METHOD FOR FILE LEVEL REMOTE COPY OF A STORAGE DEVICE

(75) Inventors: Kyosuke Achiwa, Tokyo (JP); Kazuhiko Mogi, Tokyo (JP); Manabu Kitamura, Tokyo (JP); Yoshiki Kano, Tokyo (JP); Katsunori Nakamura, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 205 days.

(21) Appl. No.: 09/947,268

(22) Filed: Sep. 5, 2001

(65) Prior Publication Data

US 2003/0009438 A1     Jan. 9, 2003

(30) Foreign Application Priority Data

Jul. 5, 2001     (JP) .............................. 2001-204306

(51) Int. Cl.
    G06F 17/30     (2006.01)
(52) U.S. Cl. ..................... 707/204; 711/162; 714/100
(58) Field of Classification Search ................ 707/204; 711/162; 714/100
    See application file for complete search history.

(56) References Cited

U.S. PATENT DOCUMENTS

| | | | |
|---|---|---|---|
| 5,403,639 A * | 4/1995 | Belsan et al. ................ 707/204 |
| 5,673,190 A * | 9/1997 | Kahleck et al. ................ 700/2 |
| 5,675,769 A * | 10/1997 | Ruff et al. ................... 711/173 |
| 5,742,792 A | 4/1998 | Yanai et al. | |
| 5,799,141 A * | 8/1998 | Galipeau et al. ............... 714/13 |
| 5,832,510 A * | 11/1998 | Ito et al. ...................... 707/201 |
| 5,978,791 A * | 11/1999 | Farber et al. ................... 707/2 |
| 6,185,575 B1 * | 2/2001 | Orcutt ......................... 707/200 |
| 6,192,408 B1 * | 2/2001 | Vahalia et al. ............... 709/229 |
| 6,209,002 B1 * | 3/2001 | Gagne et al. ................ 707/204 |
| 6,327,671 B1 * | 12/2001 | Menon ........................... 714/6 |
| 6,377,958 B1 * | 4/2002 | Orcutt ......................... 707/200 |
| 6,532,527 B1 * | 3/2003 | Selkirk et al. ............... 711/203 |
| 6,539,462 B1 * | 3/2003 | Mikkelsen et al. .......... 711/162 |
| 6,549,920 B1 * | 4/2003 | Obara et al. ................. 707/204 |
| 6,615,365 B1 * | 9/2003 | Jenevein et al. ............... 714/6 |
| 6,684,306 B1 * | 1/2004 | Nagasawa et al. ........... 711/162 |
| 2003/0037247 A1 * | 2/2003 | Obara et al. ................. 713/193 |

OTHER PUBLICATIONS

EMC SRDF (Symmetrix Remote Data Facility), L523.7-J, 11/00.1, 6 pages.
Marshall Kirk McKusick, et al., *The Design and Implementation of the 4.4BSD Operating System*, Addison-Wesley, Boston (1996), Chapter 9, "The Network Filesystem," pp. 311-336.
*Nikkei Electronics*, Nov. 6, 2000, No. 782, pp. 54-55.

* cited by examiner

*Primary Examiner*—Wayne Amsbury
(74) *Attorney, Agent, or Firm*—Townsend and Townsend and Crew LLP

(57) ABSTRACT

An object of remote copy can be specified in units of a file or a directory more detailed than in units of a volume. If a host computer issues a write request of a file to NASa, NASa references a source NAS of remote copy and a source directory of remote copy at each entry on a copy file table and determines whether the file to be written is an object of remote copy; if it is determined to be an object of remote copy, the file to be written is remotely copied to a target directory of remote copy of a target NAS thereof.

3 Claims, 17 Drawing Sheets

EXAMPLE OF COPY FILE TABLE

| ENTRY NO. | SOURCE NAS OF REMOTE COPY (1320) | SOURCE DIRECTORY OF REMOTE COPY (1330) | TARGET NAS OF REMOTE COPY (1340) | TARGET DIRECTORY OF REMOTE COPY (1350) |
|---|---|---|---|---|
| 0 | NASa | /tako/ika.txt | NASb | /uni |
| 1 | NASa | /apple | NASc | /banana |
| 2 | −1 | — | — | — |
| 3 | −1 | — | — | — |

LOG FILE ENTRY 1400

| SOURCE NAS OF WRITE OPERATION | ~1410 |
| SOURCE PATH OF WRITE OPERATION | ~1420 |
| FILE NAME | ~1430 |

EXAMPLE OF LOG FILE

| | SOURCE NAS OF WRITE OPERATION 1410 | SOURCE PATH OF WRITE OPERATION 1420 | FILE NAME 1430 |
|---|---|---|---|
| FIRST ENTRY | NASa | /tako/ika.txt | 00000123.yob |
| SECOND ENTRY | NASa | /apple/t.c | 00000124.yob |
| ⋮ | ⋮ | ⋮ | ⋮ |

EMERGENCY TABLE 1500

| EMERGENCY NAS | ~1510 |
| EMERGENCY DIRECTORY | ~1520 |

EXAMPLE OF EMERGENCY TABLE

| EMERGENCY NAS | EMERGENCY DIRECTORY |
|---|---|
| NASd | /yobi |

FIG. 18

EXAMPLE OF COPY FILE TABLE

| ENTRY NO. | SOURCE NAS OF REMOTE COPY (1320) | SOURCE DIRECTORY OF REMOTE COPY (1330) | TARGET NAS OF REMOTE COPY (1340) | TARGET DIRECTORY OF REMOTE COPY (1350) |
|---|---|---|---|---|
| 0 | NASa | /tako/ika.txt | NASe | /bkup |
| 1 | NASb | /foo/boo.c | NASe | /bkup |
| 2 | NASc | /important | NASe | /bkup |
| 3 | −1 | — | — | — |
| ⋮ | ⋮ | ⋮ | ⋮ | ⋮ |

METHOD FOR FILE LEVEL REMOTE COPY OF A STORAGE DEVICE

BACKGROUND OF THE INVENTION

1. Field of the Invention

The present invention relates to a storage system for executing a remote copy operation, and more particularly to a storage system for specifying an object of remote copy in units of a file or a directory instead of in units of a volume.

2. Description of the Related Art

Conventionally, there is a technology which is referred to as remote copy for copying data between storage systems.

The remote copy is dual writing without an intermediation of a host computer among a plurality of storage systems physically apart from each other. In the remote copy, storage systems located in a first site and a second site are connected to each other through a private line or a public line. Additionally, a logical volume having the same capacity as a logical volume to be copied on the storage system at the first site (hereinafter, referred to as a copy source logical volume) is formed as a logical volume (hereinafter, referred to as a copy destination logical volume) paired with the logical volume to be copied on the storage system at the first site onto the storage system at the second site. Then, data in the first site copy source logical volume is copied to the second site copy destination logical volume. If the data in the first site copy source logical volume is updated by the host computer, the updated data is transferred to the second site storage system and written into the copy destination logical volume. In this manner, the duplicate condition of the logical volume is always maintained at the first site and the second site in the remote copy technology.

Therefore, even if the storage system at the first site is unusable due to a natural disaster such as an earthquake or a flood or human disaster such as a fire or terrorism, the logical volume on the storage system at the second site can be used to restart operations quickly.

Prior arts related to the remote copy are disclosed in U.S. Pat. No. 5,742,792 or in EMC Symmetrix Remote Data Facility (EMC SRDF) L523.7-J 11/00.1.

A network attached storage (NAS) is a storage appliance connected to a network and used for processing file level access requests. Unlike a block level storage device (SCSI-connected hard disk, etc.), the NAS has a file system such as the network filesystem (NFS) and is capable of processing access requests to a file or a directory.

A file server is based on a concept similar to the NAS. The file server is connected to a network and used for processing file access requests in the same manner as for the NAS. The NAS differs from the file server in a respect that the NAS is a storage as an appliance specialized in input-output services of files and therefore it is useful to construct a robust system resistant to system down in comparison with a normal file server, in compensation for an omission of processing completely unrelated to the input-output services.

Regarding the NAS, there is a description in "Nikkei Electronics; the 2000.11.6 (No. 782) issue" (P. 54, 55) published by Nikkei Business Publications, Inc.

Regarding the NFS and the NFS server, there is a detailed description in "4.4 BSD Operating System" (P. 311 to 336) by Marshall Kirk McKusick, et al. published by Addison Wesley.

In the foregoing prior art, however, the remote copy is executed in units of a volume and therefore objects of the remote copy includes minor files, which are not important and do not need to be duplicated, stored in the volume. As a result, an amount of data to be copied increases, thereby increasing the time for the copy.

SUMMARY OF THE INVENTION

It is an object of the present invention to provide means for specifying an object of remote copy for NAS at more detailed levels.

To achieve the above object, a storage system for accepting a file request has remote copy information for specifying a destination of remote copy in units of a file or a directory. Then, the storage system receives a write request of a file, determines whether the file for which the write request is issued is an object of remote copy on the basis of the remote copy information, and if it is an object of remote copy, executes a remote copy operation to a remote copy destination acquired from the remote copy information. This realizes more detailed remote copy specification in units of a file or a directory.

BRIEF DESCRIPTION OF THE DRAWINGS

FIG. 18 is an example of a copy file table according to the third embodiment;

DETAILED DESCRIPTION OF THE EMBODIMENTS

Figure 1:
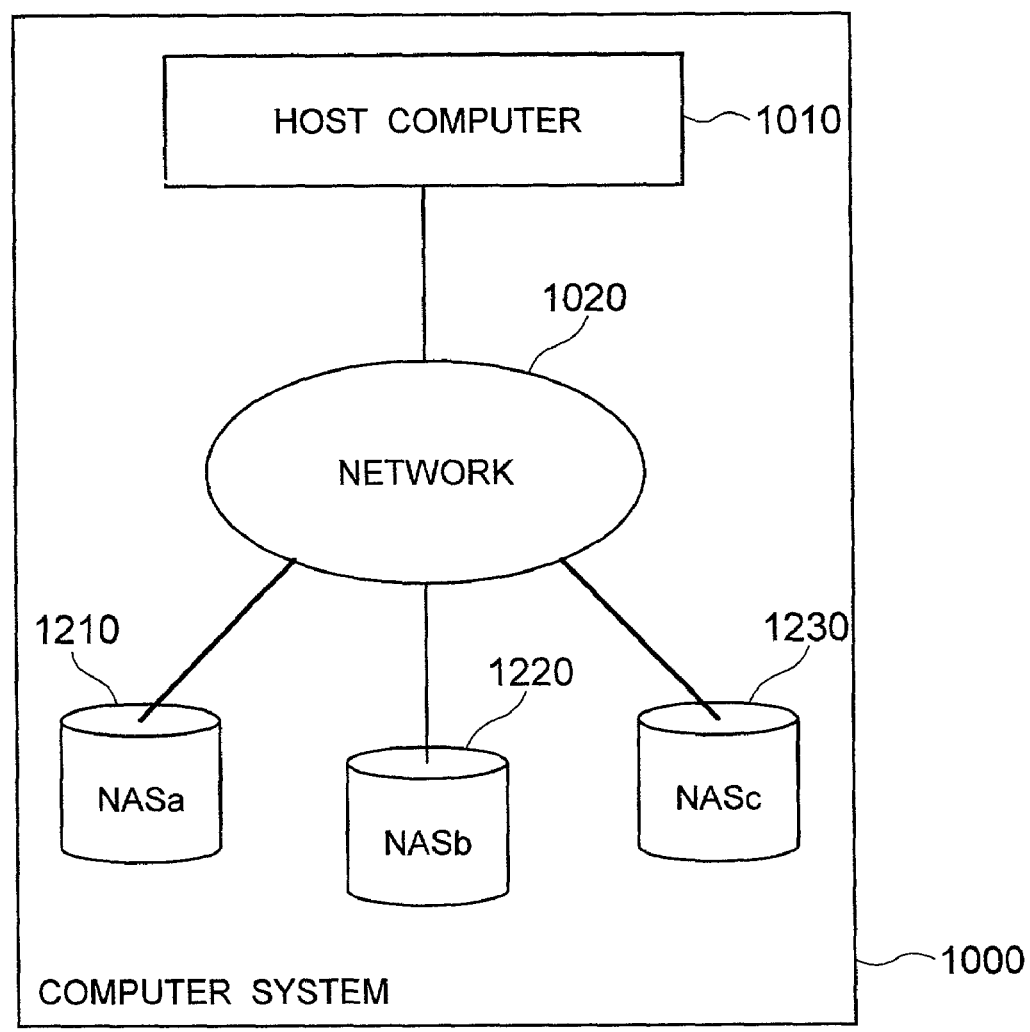
FIG. 1 is a computer system according to a first embodiment.

Referring to FIG. 1, there is shown a computer system 1000 according to a first embodiment.

The computer system 1000 comprises a host computer 1010 for issuing a file access request, a plurality of NAS devices 1200 for processing file access requests issued by the host computer 1010; NASa 1210, NASb 1220, and NASc 1230, and a network 1020 for connecting them. The host computer 1010, NASa 1210, NASb 1220, and NASc 1230 are assumed to be located in buildings physically tens of kilometers away from each other. Therefore, for example, it is assumed that, even if NASa 1210 becomes unusable due to a big earthquake in the area where the NASa 1210 is located, the remaining host computer 1010, NASb 1220, NASc 1230, and network 1020 connecting them are still usable.

Figure 2:
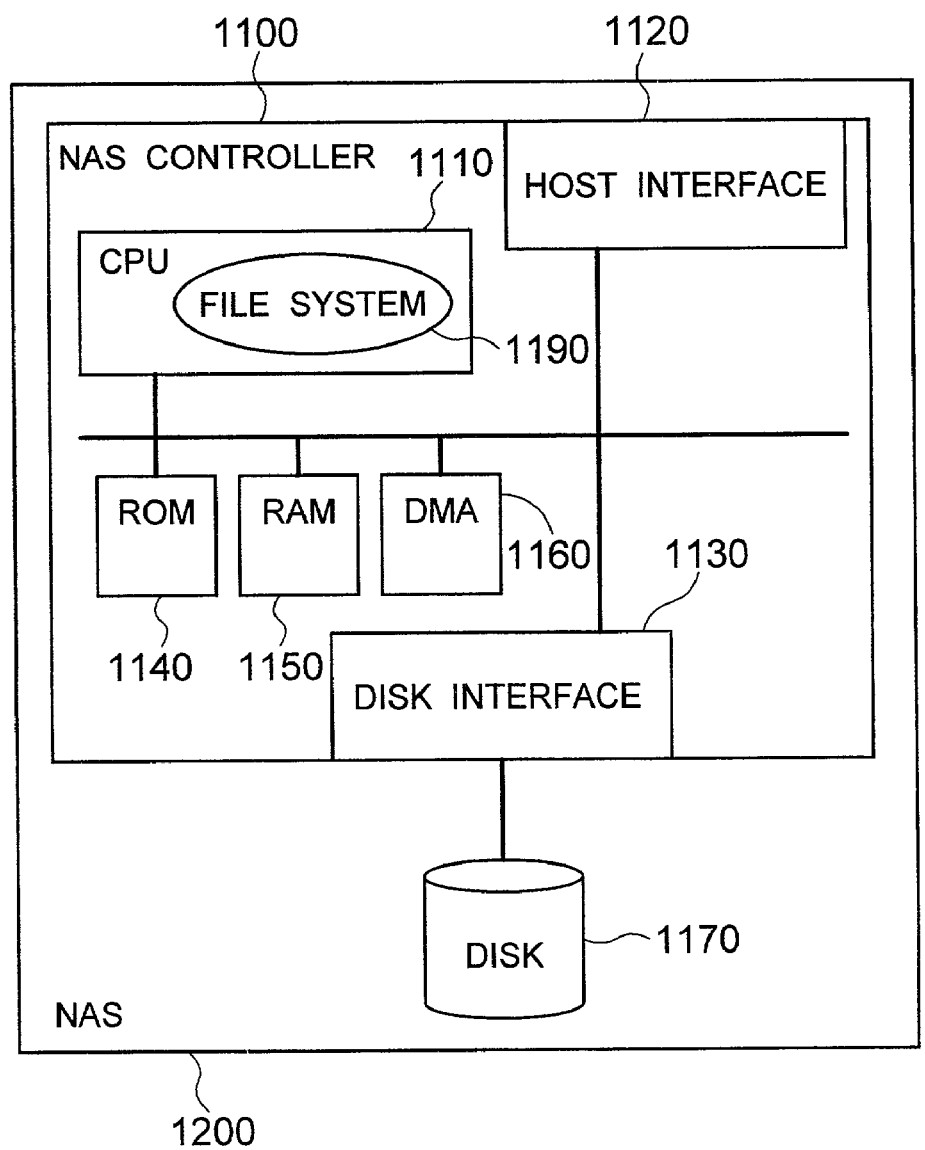
FIG. 2 is a configuration diagram of an NAS according to the first embodiment.

Referring to FIG. 2, there is shown a configuration diagram of the NAS 1200. The NAS 1200 stores files written by the host computer 1010 and performs a file access in response to a request from the host computer 1010. The NAS 1200 comprises a disk 1170 actually storing file data and an NAS controller 1100 for accepting the file access request from the host computer 1010 and writing or reading file data to or from the disk 1170.

The NAS controller 1100 comprises a host interface 1120 connected to the network 1020, a disk interface 1130 for exchanging data with the disk 1170, ROM 1140 containing a program for controlling the NAS 1200, RAM 1150 for retaining data required for controlling the NAS 1200 and the copy file table 1300 described later and used also as a disk cache, a DMA 1160 for performing a data transfer, and a CPU 1110 for executing a control program of the NAS 1200. The NAS 1200 contains a file system 1190 so as to process a file access request from the host computer 1010.

Figures 3, 4:
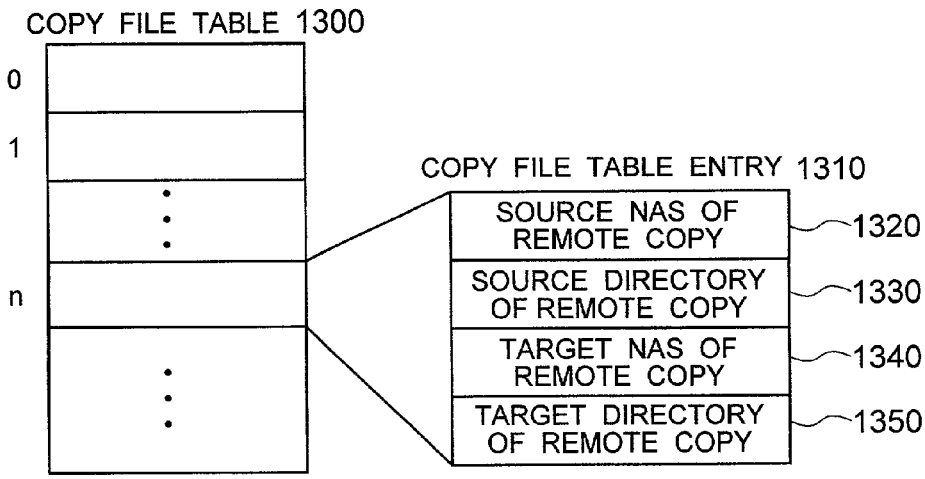
FIG. 3 is a copy file table according to the first embodiment.
FIG. 4 is an example of the copy file table according to the first embodiment.

Referring to FIG. 3, there is shown the copy file table 1300 having information of remote copy source files or directories and remote copy destinations. In this embodiment, the copy file table 1300 is generated in the host computer 1010 and copied to each NAS 1200.

A copy file table entry 1310 has information of a source NAS of remote copy 1320, a source directory (or file) of remote copy 1330, a target NAS of remote copy 1340, and a target directory of remote copy 1350. For a free entry having no meaningful information, a value −1 is entered in the source NAS of remote copy 1320.

The copy file table 1300 is concretely described by using an example shown in FIG. 4.

At entry number 0, the source NAS of remote copy 1320 is NASa 1210, the source directory of remote copy 1330 is /tako/ika.txt, the target NAS of remote copy 1340 is the NASb 1220, and the target directory of remote copy 1350 is /uni. This entry means that the file /tako/ika.txt of the NASa 1210 is an object of the remote copy and its remote copy destination is the directory /uni of NASb 1220.

Subsequently, at the entry number 1, the source NAS of remote copy 1320 is NASa 1210, the source directory of remote copy 1330 is /apple, the target NAS of remote copy 1340 is NASc 1230, and the target directory of remote copy 1350 is /banana. This means that all files belonging to /apple and subdirectories under it of NASa 1210 are objects of the remote copy and their remote copy destination is /banana of NASb 1220. For example, a file /apple/red/t.c of NASa 1210 is copied to /banana/red/t.c in NASc 1230. (While the remote copy destination can be /banana/t.c, it is assumed that a structure of the subdirectories is also copied in this embodiment. Naturally the present invention is applicable in both cases.)

At entry number 2 and after, a value −1 is entered in the source NAS of remote copy 1320 and these entries are invalid (free).

Therefore, the objects of remote copy are the /tako/ika.txt file and the /apple and subsequent files stored in NASa 1210 in the example shown in FIG. 4.

Figure 5:
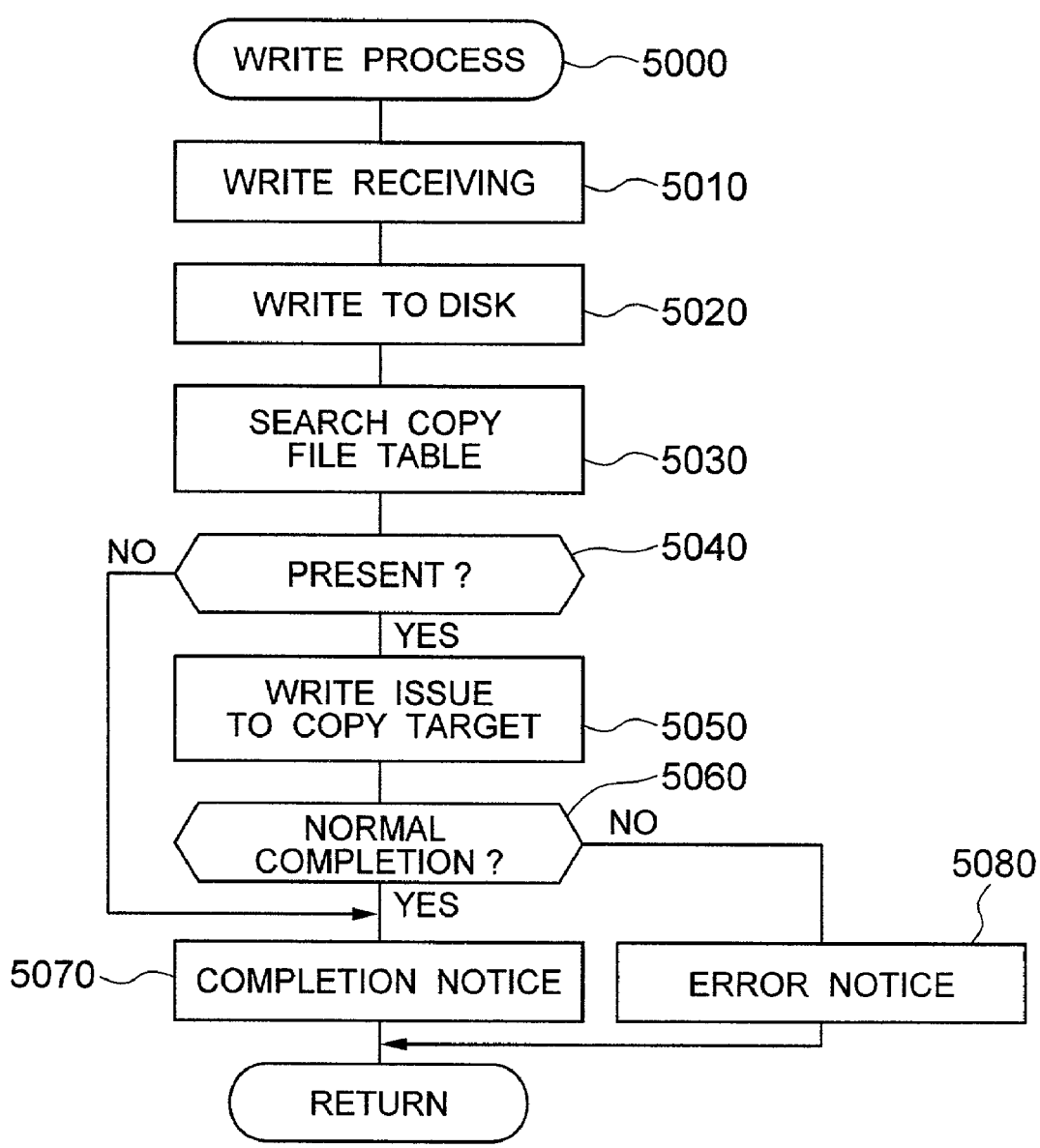
FIG. 5 is a flowchart of a write process according to the first embodiment.

Referring to FIG. 5, there is shown a flowchart of a write process 5000 executed by NAS 1200 when the host computer 1010 issued a write request.

First, in step 5010, a write request and data to be written are received from the host computer 1010 through the network 1020 and, in step 5020, the write data is written into the disk 1170. Then, in step 5030 the copy file table is searched for the "corresponding" entry. If the source NAS of remote copy 1320 indicates its own NAS 1200 and the file to be written is the file indicated by the source directory of remote copy 1330 or a file stored in the directory indicated by the source NAS of remote copy 1330 or in its subdirectory, it is determined to be "corresponding."

Then, if it is determined that there is no "corresponding" entry in step 5040, the control jumps to step 5070 described later and, if it is determined that there is the "corresponding" entry, a write request is issued so that the write requested file is written into a file or a directory indicated by the target directory of remote copy 1350 in the NAS 1200 indicated by the target NAS of remote copy 1340 and then the file data is transferred to the target NAS 1200 to await a completion of the write operation in step 5050.

In step 5060, if a normal completion is returned by the target NAS 1200 into which the file is written, a completion notice is returned to the host computer 1010 in step 5070 and the write process 5000 completes. If an abnormal termination is returned from the target NAS 1200, the host computer 1010 is notified of the abnormal termination in step 5080 and the write process 5000 terminates.

In this manner, when the file to be remotely copied is written into the NAS 1200, it is written into the disk 1170 of the NAS 1200 in which the file is written, and then the file is written into the target NAS 1200 of remote copy 1200 and a write completion is returned to the host computer 1010, by which, if a normal completion is reported after the file to be remotely copied is written into the target NAS 1200, it is assured from a viewpoint of the host computer 1010 that the written file is written into two NAS devices 1200 located physically apart from each other.

Figure 6:
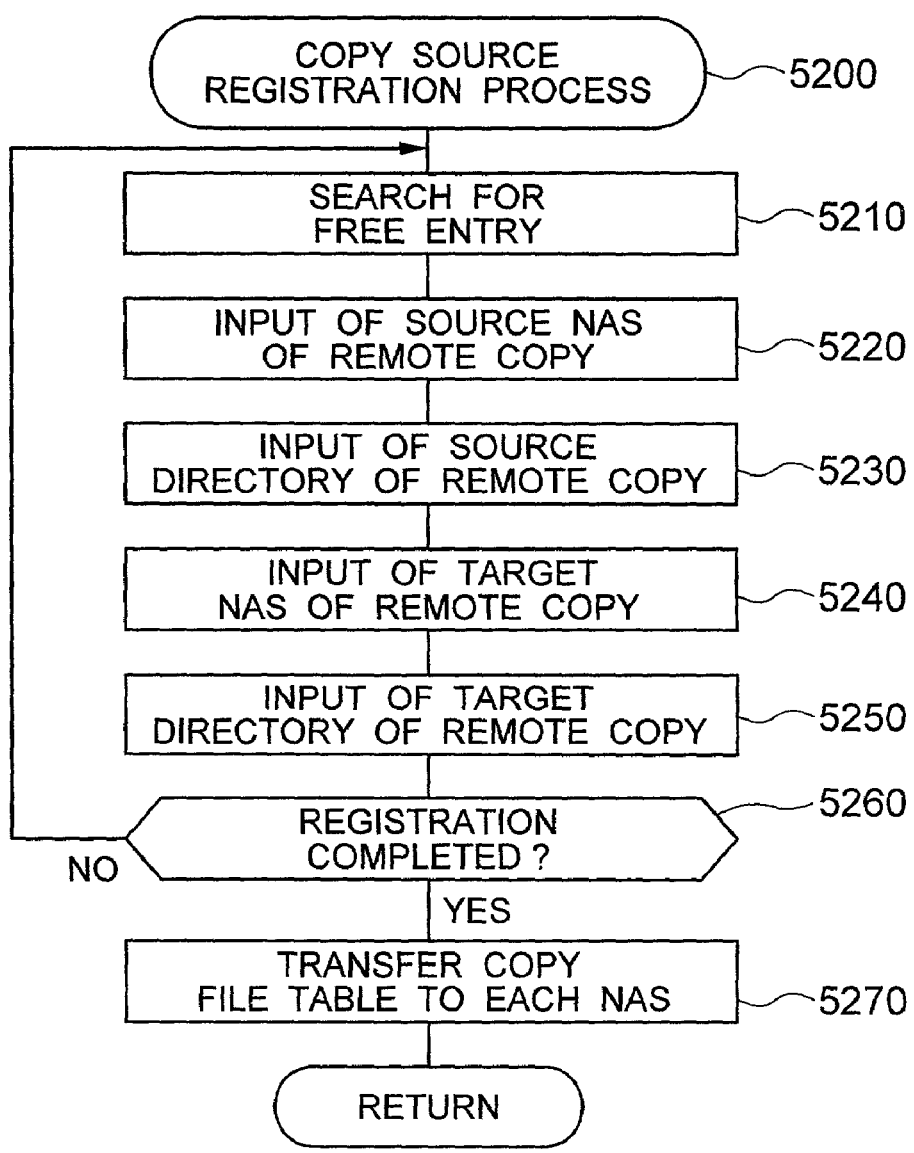
FIG. 6 is a flowchart of a copy source registration process according to the first embodiment.

Referring to FIG. 6, there is shown a flowchart of the copy source registration process 5200 executed by the host computer 1010 when a user registers a file or a directory to be remotely copied.

First, the copy file table 1300 is searched for a free entry in which value −1 is entered in the source NAS of remote copy 1320 in step 5210, a user inputs a name of the source NAS of remote copy and sets it to the source NAS of remote copy 1320 in the free entry in step 5220, inputs a file or directory path to be copied from and sets it to the target directory of remote copy 1330 in the free entry in step 5230, inputs a copy destination NAS and sets it to the target NAS of remote copy 1340 in the free entry in step 5240, and inputs a path of the copy destination file or directory and sets it to the target directory of remote copy 1350 in the free entry in step 5250.

Then, it is determined whether to complete the registration (inquiring of the user whether to complete the registration) in step 5260; unless the registration is determined to be completed the control jumps to step 5210 or otherwise the copy of the updated copy file table 1300 is transferred to each NAS 1200 (in the configuration of this embodiment, NASa 1210, NASb 1220, and NASc 1230) in step 5270 and then the copy source registration process 5200 completes.

While it is assumed that a free entry is necessarily found in the step 5210 to simplify the description in this embodiment, there is a need for inserting a process of an erroneous termination when no free entry is found in an actual implementation. Apparently this simplification does not change the essence of the present invention at all.

Figure 7:
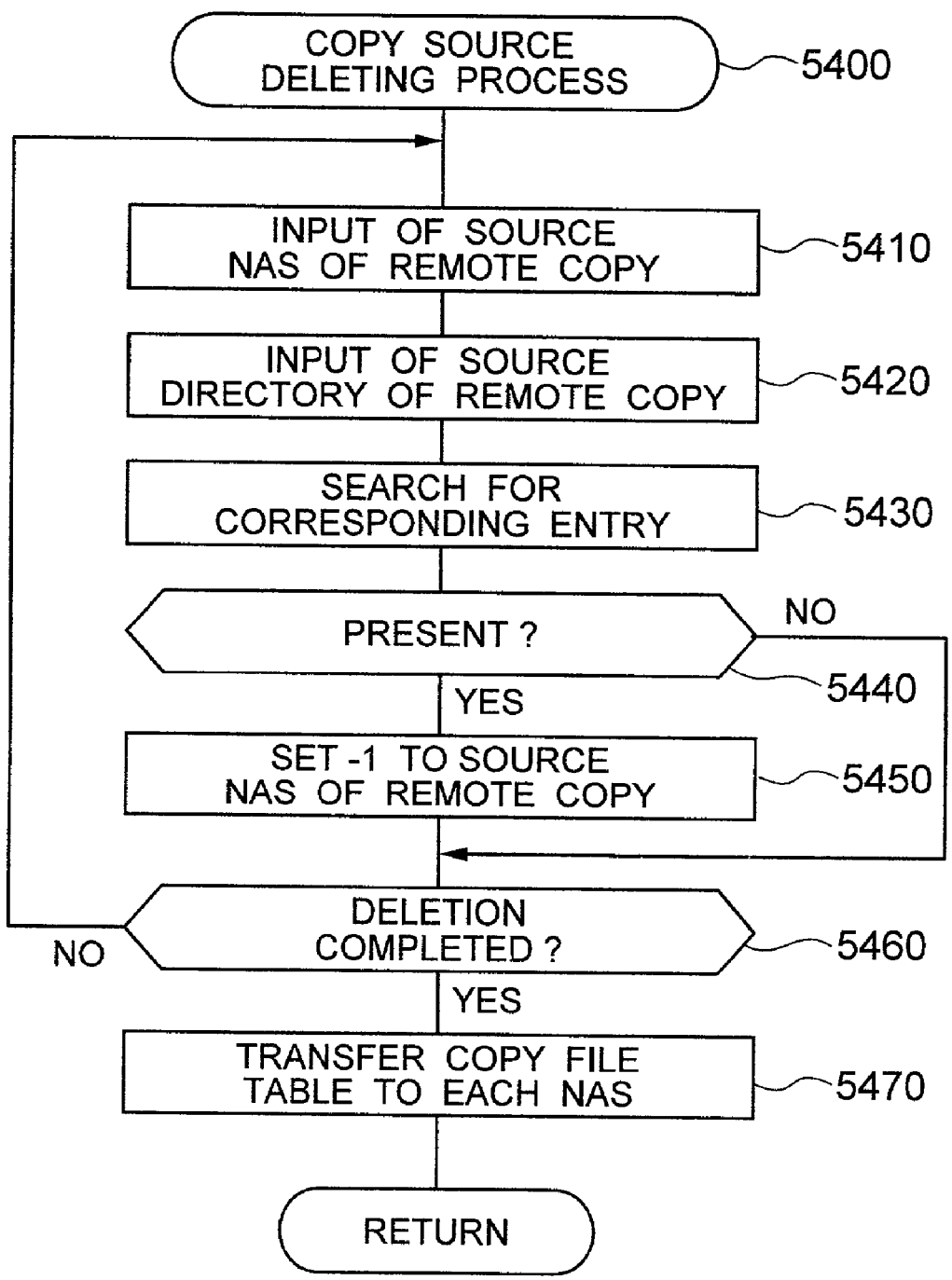
FIG. 7 is a flowchart of a copy source deleting process according to the first embodiment.

Referring to FIG. 7, there is shown a flowchart of the copy source deleting process 5400 to be executed by the host computer 1010 when a file or a directory is required to be removed from objects of remote copy by deleting an entry from the copy file table 1300.

First, the user inputs a name of the NAS 1200 containing the file or the directory that the user wants to remove from the objects of remote copy in step 5410 and then inputs a path of the file or the directory in step 5420. Then, the copy file table entry 1310 matching the information inputted by the user is searched for in step 5430 and it is determined whether the corresponding entry is present in step 5440. If it is absent, the control jumps to step 5460 described later. Otherwise, value −1 is set to the source NAS of remote copy 1320 of the entry in step 5450 and then it is determined whether the deletion is finished in step 5460. This determination is performed by inquiring of the user whether to finish the deleting process. Unless the deletion is finished, the control jumps to the step 5410. If it is finished, the copy of the updated copy file table 1300 is transferred to each NAS 1200 (in the configuration of this embodiment, NASa 1210, NASb 1220, and NASc 1230) in step 5470 and then the copy source deleting process 5400 is completed.

While the copy source registration process 5200 and the copy source deleting process 5400 are executed by the host computer 1010 in this embodiment, they can be executed by another computer connected to the network 1020 or the NAS 1200. If so, the present invention is applicable apparently. (In both cases, however, there is a need for copying the update copy file table to each NAS 1200.)

Figure 8:
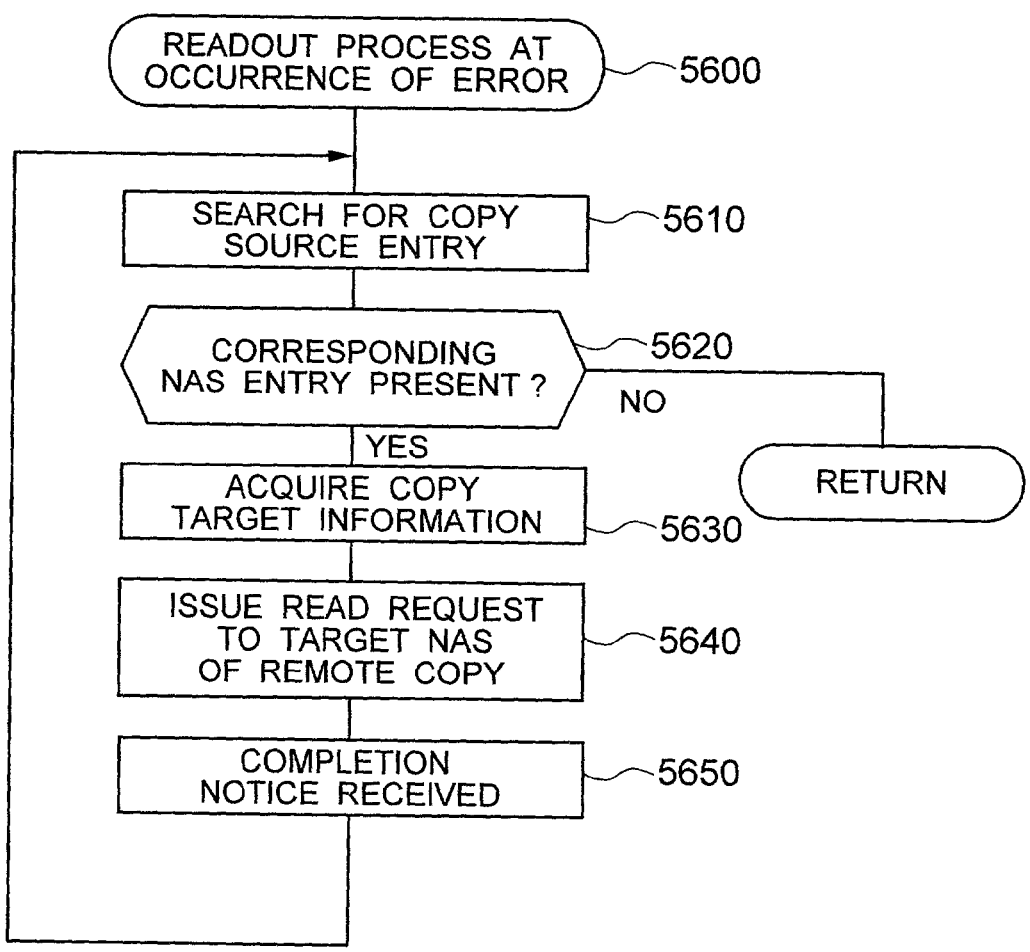
FIG. 8 is a flowchart of a readout process at occurrence of an error according to the first embodiment.

Referring to FIG. 8, there is shown a flowchart of the readout process at occurrence of an error 5600 executed by the host computer 1010 to read out a file which has been remotely copied from the first NAS 1200 to the second NAS 1200, when the first NAS 1200 becomes unusable due to an occurrence of an earthquake. Although how the read file is used is not clearly stated in this process, it is expected to be treated in such a way that the file is stored in a local disk connected to the host computer 1010.

First, the copy file table 1300 is searched from the beginning for an entry whose source NAS of remote copy 1320 matches the unusable NAS 1200 in step 5610. Unless the corresponding entry is determined to be found in step 5620, the readout process at occurrence of the error 5600 terminates. If it is determined to be found in step 5620, there is obtained information of the copy destination, namely, information of the target NAS of remote copy 1340 and information of the target directory of remote copy 1350 from the corresponding entry in step 5630, and then in step 5640 read requests are issued to the target NAS 1340 so as to read the file indicated by the target directory of remote copy 1350 and all the files stored in the subdirectories. Then, in step 5650 all completion notices are received from the target NAS 1200 and the control jumps to the step 5610.

In this manner, all of the remote copy files can be read out.

In the first embodiment, an abnormal termination is reported to the host computer 1010 when the write operation to the remote copy destination abnormally terminates in the write process 5000. In this condition, the process also abnormally terminates when a remote copy destination volume becomes full. To prevent this, a free area of the remote copy destination volume must be always reserved. In the second embodiment, there is described a process of decreasing the above abnormal terminations by writing a file in an emergency area if the file cannot be written into a remote copy destination volume since the volume becomes full.

For simplification, parts different from the first embodiment will be mainly described here. The parts whose explanation is omitted are the same as those of the first embodiment.

Figure 9:
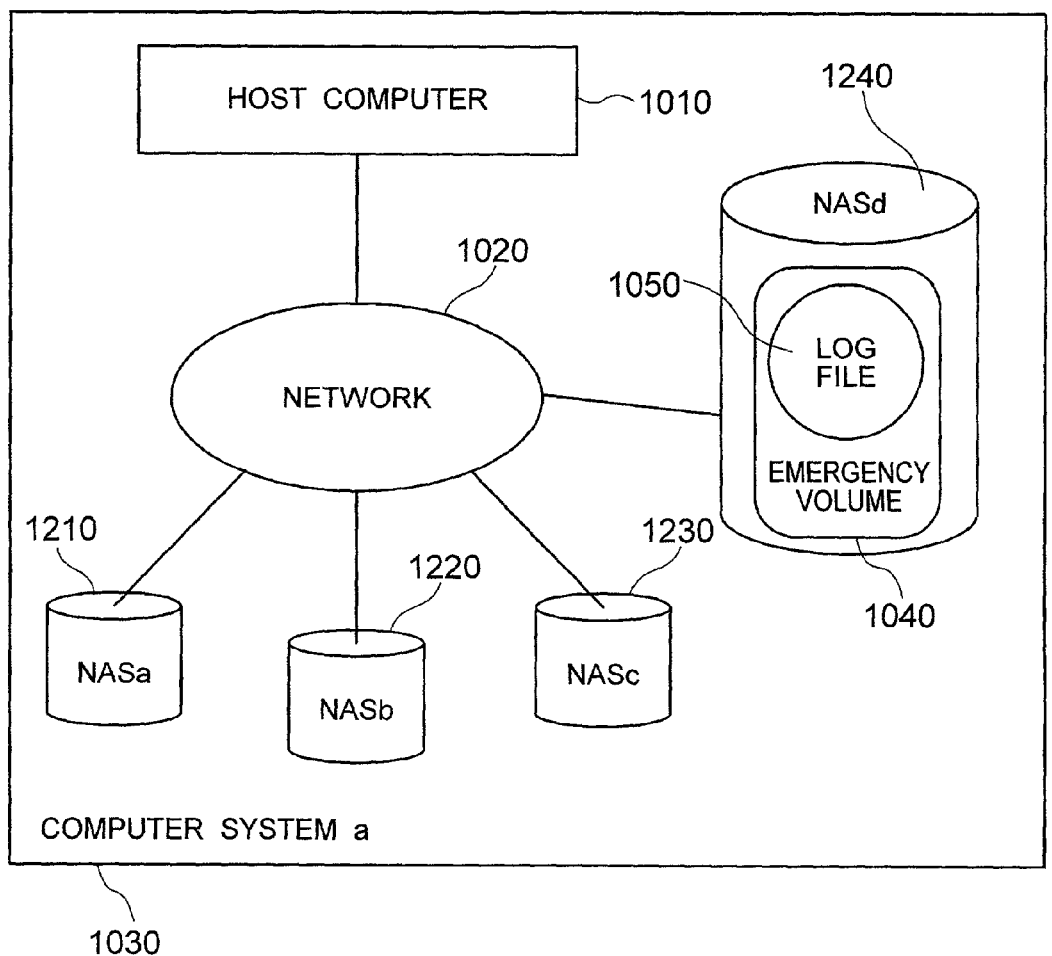
FIG. 9 is a diagram showing a computer system a according to a second embodiment.

Referring to FIG. 9, there is shown a configuration diagram of a computer system a 1030 according to this embodiment. The computer system a 1030 comprises a host computer 1010, a network 1020, NASa 1210, NASb 1220, NASc 1230, and NASd 1240 having an emergency volume 1040 which is an area for storing files which failed in remote copy. A log file 1050 described later exists in the emergency volume 1040. The NAS 1200 which failed in remote copy copies the file to the emergency volume 1040 and then adds information of a single entry to the log file 1050.

Figures 10, 11:
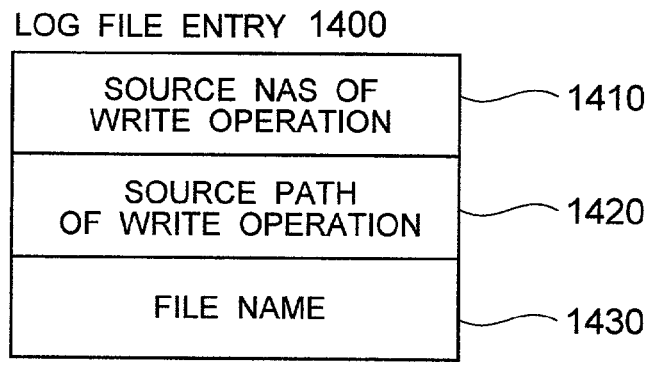
FIG. 10 is a log file entry according to the second embodiment.
FIG. 11 is an example of a log file according to the second embodiment.

The log file 1050 comprises one or more log file entries 1400 shown in FIG. 10. It has information of a write source NAS 1410 indicating the NAS 1200 which added the entry, a write source path 1420 having a full-path file name (in the write source NAS 1410) of a file which failed in remote copy, and a file name 1430 indicating the file in an emergency volume which corresponds to the remote-copy-failed file. The file names in the emergency volume 1040 are generated at random so that there is no identical file name in the emergency volume 1040.

Referring to FIG. 11, there is shown an example of the log file 1050. In this example, assuming an example of the copy file table 1300 shown in FIG. 4, there is shown an example of the log file 1050 when the host computer 1010 writes a file /tako/ika.txt in NASa 1210 and a file /apple/t.c in NASa 1210 and errors occur at the remote copy operations for both files. The first entry is generated when an error occurs at an attempt of remote copy of the file /tako/ika.txt in NASa 1210 to /uni in NASb 1220 and the data is stored with a file name 00000123.yob into the emergency volume 1040 of NASd 1240. This entry includes NASa 1210 as a source NAS of the write operation 1410, /tako/ika.txt as a source path of the write operation 1420, and 00000123.yob as a file name 1430.

The next entry is generated when an error occurs at an attempt of remote copy of the file /apple/t.c in the NASa 1210 to /banana in the NASc 1230 and therefore the data is stored with a file name 00000124.yob into the emergency volume 1040 of NASd 1240. This entry includes NASa 1210 as a source NAS of the write operation 1410, /apple/t.c as a source path of the write operation 1420, and 00000124.yob as a file name 1430.

Figures 12, 13:
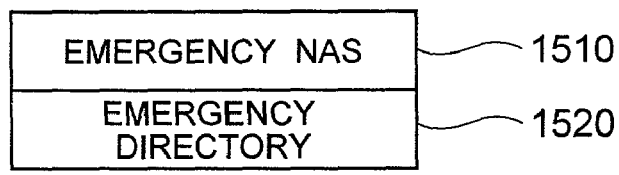
FIG. 12 is an emergency table according to the second embodiment.
FIG. 13 is an example of the emergency table according to the second embodiment.

Referring to FIG. 12, there is shown the emergency table 1500 managed by the host computer 1010 and whose copies are stored in each NAS 1200 (NASa 1210, NASb 1220, NASc 1230, and NASd 1240). The emergency table 1500 is used for acquiring information related to an emergency storage area in case of a failure of remote copy in the NAS 1200, having information of an emergency NAS 1510 and an emergency directory 1520.

Referring to FIG. 13, there is shown an example of the emergency table 1500. As described in FIG. 9, a file failing in remote copy is written into the emergency volume 1040 of NASd 1240. In the example shown in FIG. 13, the emergency NAS 1510 is NASd 1240 and the emergency directory 1520 is /yobi indicating a directory of the emergency volume 1040. (In other words, data is stored in the emergency volume 1040 if a file is written into /yobi or its subdirectories of NASd 1240.)

Figure 14:
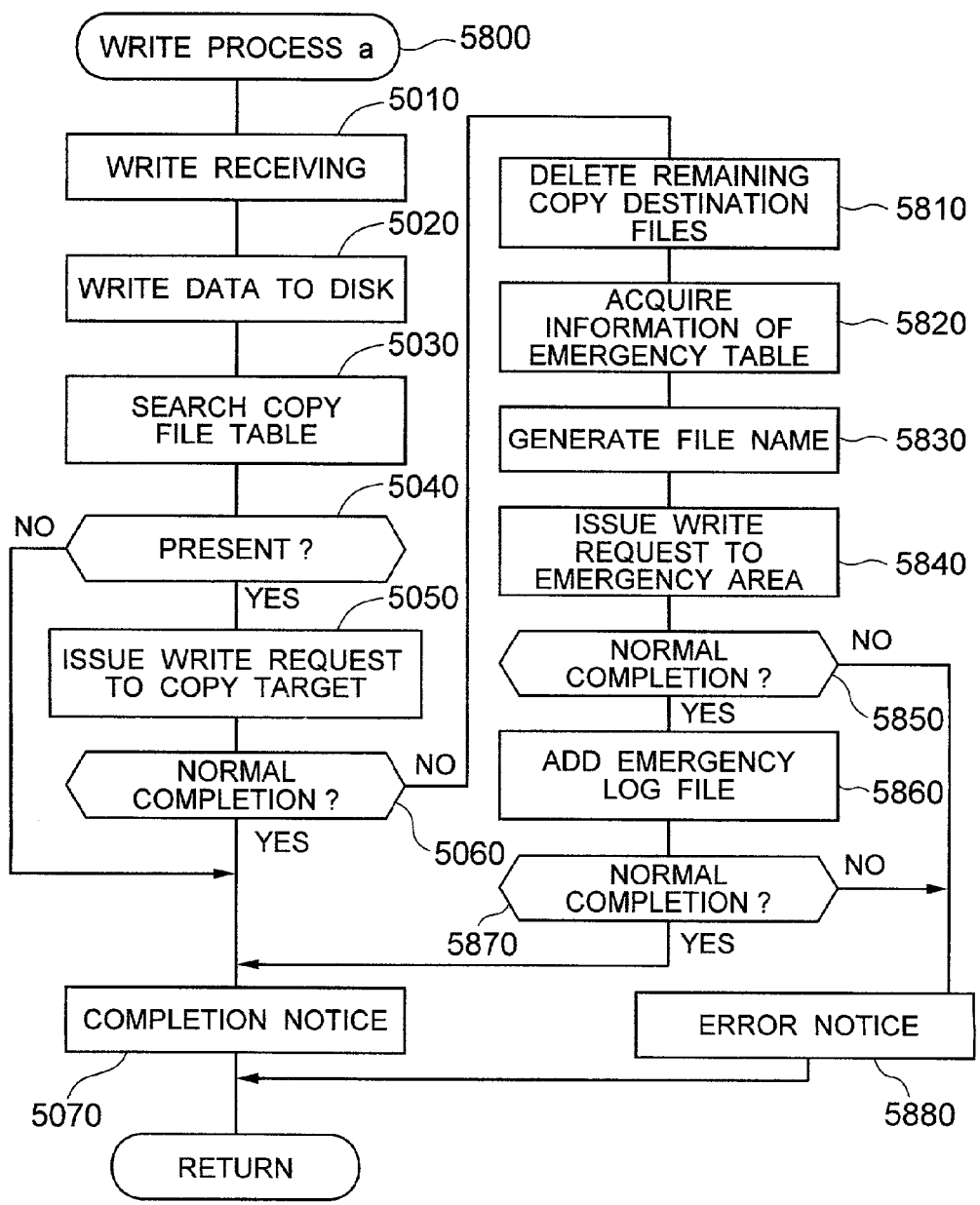
FIG. 14 is a flowchart of a write process a according to the second embodiment.

Referring to FIG. 14, there is shown a flowchart of the write process a 5800 executed by a NAS 1200 when the host computer 1010 issues a write request to the NAS 1200.

First, a write request and data to be written are received through the network 1020 from the host computer 1010 in step 5010 and the write data is written into the disk 1170 in step 5020. Then, the copy file table 1300 is searched for a "corresponding" entry in step 5030. If the source NAS of remote copy 1320 indicates itself and the file to be written is a file indicated by the source directory of remote copy 1330 or a file stored in a directory indicated by the source directory of remote copy 1330 or in its subdirectory, the file is determined to be "corresponding."

Then, if it is determined that there is no "corresponding" entry in step 5040, the control jumps to step 5070 described later and, if it is determined that there is the "corresponding" entry, a write request is issued so that the write requested file is written into a file or a directory indicated by the target directory of remote copy 1350 in the NAS 1200 indicated by the target NAS of remote copy 1340 and then the file data is transferred to the target NAS 1200 to await a completion of the write operation in step 5050.

In step 5060, if a normal completion is returned by the target NAS 1200 into which the data is written, a completion notice is returned to the host computer 1010 in step 5070 and the write process a 5800 completes. If an abnormal termination is returned, the remaining corrupted data of the file failing in the write operation is deleted in step 5810. This step is necessary to prevent the computer from reading incorrect data at recovery of the remote copy file, when the readout process at occurrence of error 6200 described later is performed at the host computer after the NAS of the write process a 5800 becomes unavailable. Then, information of the emergency table 1500 is acquired in step 5820, a file name is generated at random so as to be unique in the directory indicated by the emergency directory 1520 of the emergency NAS 1510 in step 5830, and the file failing in the write operation is written with the generated file name into the emergency directory 1520 of the emergency NAS 1510.

Then, it is determined whether the write operation is successful in step 5850; if it is unsuccessful, an error is reported to the host computer 1010 in step 5880 and the write process a 5800 is terminated.

If the write operation is successful in step 5850, information of the source NAS of the write operation 1410, the source path of the write operation 1420, and the generated file name 1430 are added in step 5860 to the log file 1050 existing in the directory indicated by the information acquired in the step 5820. Then, it is determined whether the addition to the log file 1050 is successful in step 5870; if it is successful, the control jumps to the step 5070. Otherwise, it jumps to the step 5880.

Figure 15:
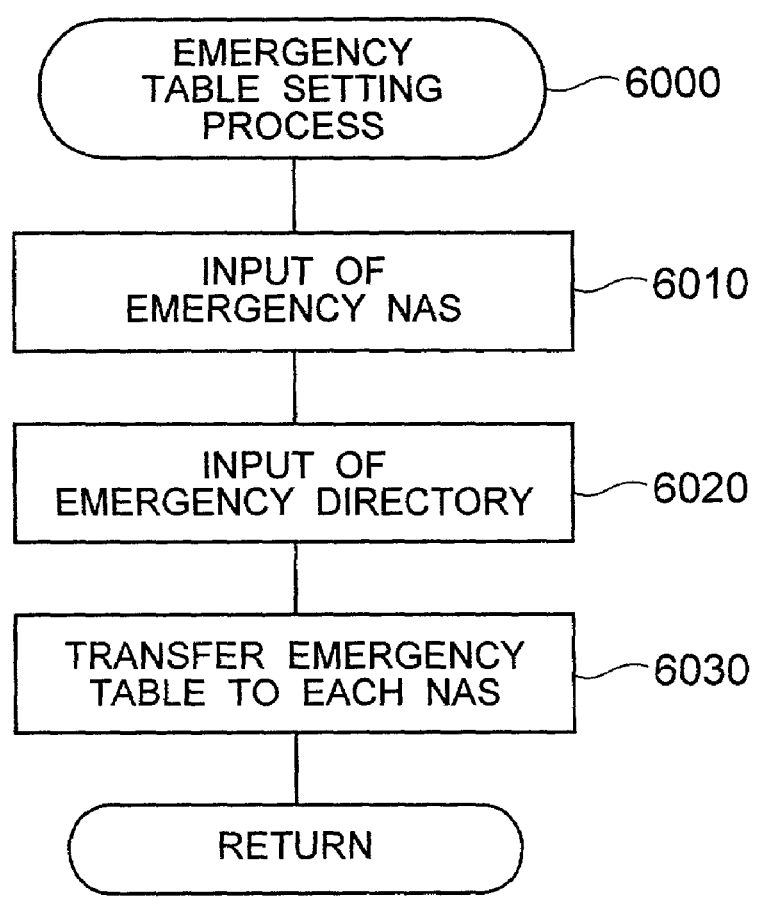
FIG. 15 is a flowchart of a emergency table setting process according to the second embodiment.

Referring to FIG. 15, there is shown a flowchart of the emergency table setting process 6000 executed by the host computer 1010 when a user sets an emergency volume 1040 for storing files failing in remote copy.

First, the user inputs an NAS 1200 as an emergency copy destination and set it to the emergency NAS 1510 on the emergency table 1500 in the host computer 1010 in step 6010. Then, the user inputs a path (directory) indicating the emergency volume 1040 to set it to the emergency directory 1520 on the emergency table 1500 in the host computer 1010 in step 6020.

Finally, in step 6030 a copy of the updated emergency table 1500 is transferred to each NAS 1200 (in the configuration of this embodiment, NASa 1210, NASb 1220, NASc 1230, and NASd 1240) and the emergency table setting process 6000 terminates.

While the emergency table setting process 6000 is executed by the host computer 1010 in this embodiment, it can be executed by another computer connected to the network 1020 or by the NAS 1200 and naturally the present invention is applicable also in the case.

Figure 16:
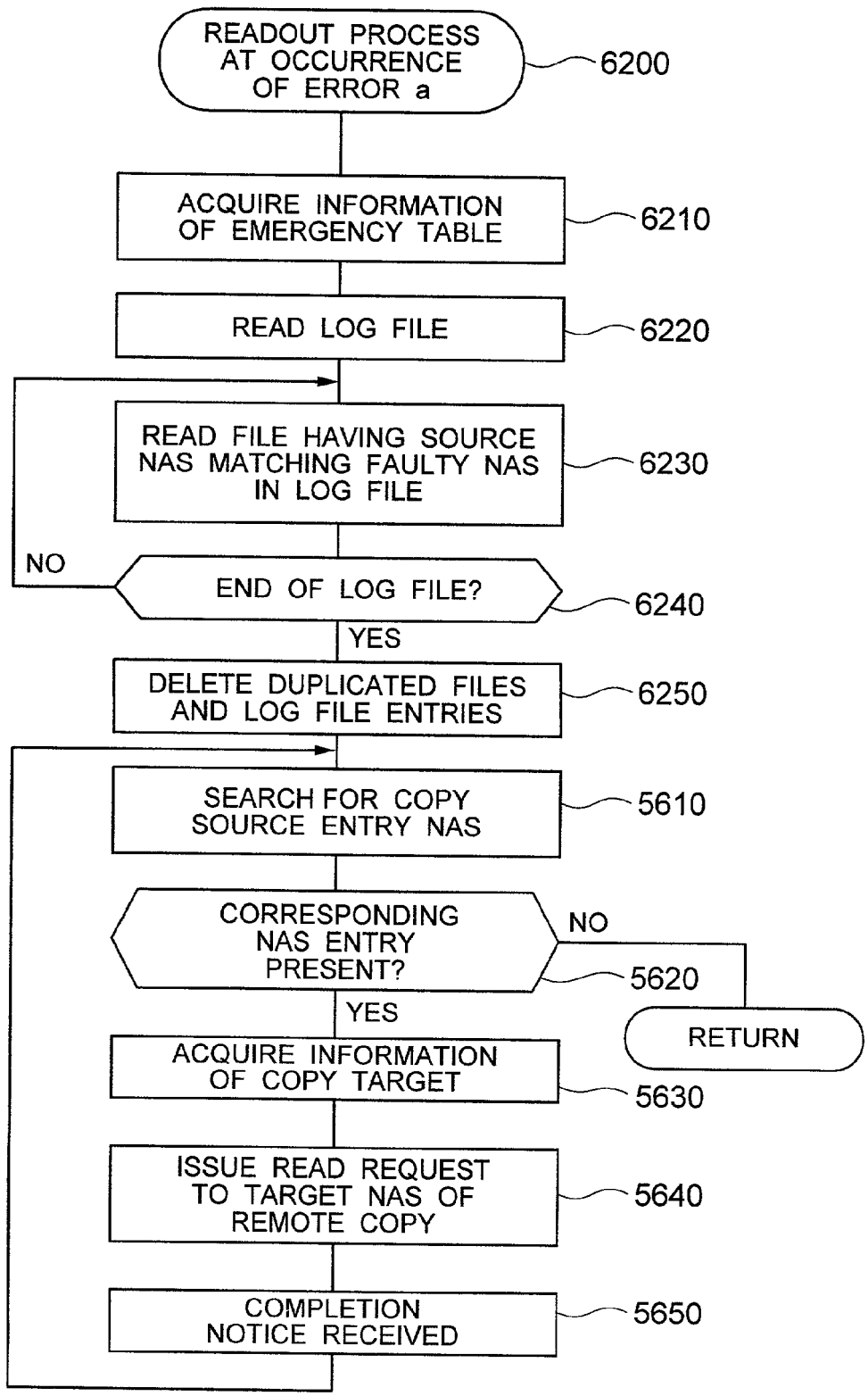
FIG. 16 is a flowchart of a readout process a at occurrence of an error according to the second embodiment.

Referring to FIG. 16, there is shown a flowchart of the readout process at occurrence of an error a 6200 equivalent to the readout process at occurrence of an error 5600 in FIG. 8 according to the first embodiment.

First, information of the emergency table 1500 is acquired in step 6210 and a log file 1050 is read from the acquired emergency directory 1520 in the acquired emergency NAS 1510 in step 6220. Then, in step 6230, an entry whose source NAS of the write operation 1410 matches an error-occurred NAS 1200 is searched for in order from the beginning of the log file 1050. And the file indicated by the file name 1430 of the searched entry is read out from the directory from which the log file 1050 is read out. Then, it is determined whether this operation is performed up to the end of the log file 1050 in step 6240; unless it is performed, the control jumps to the step 6230. Otherwise, in step 6250, when files read in step 6230 have the same source NAS 1410 and the same source directory 1420 in the log file 1050, the read files and the files in the emergency directory except one which file name has finally (recently) appeared in the log file 1050 are deleted. Further, the log file entries including the file names are deleted.

Then, the copy file table 1300 is searched for an entry whose source NAS of remote copy 1320 matches the unusable NAS 1200 from the beginning in order in step 5610 and, unless the corresponding entry exists in step 5620, the readout process at occurrence of an error a 6200 terminates. If it exists, information of the target NAS of remote copy 1340 and the target directory of remote copy 1350 which is information of the copy destination is acquired from the entry and read requests are issued to the target NAS 1340 so as to read the file indicated by the target directory of remote copy 1350 and all the files stored in its subdirectories in step 5640. Then, in step 5650 all completion notices are received from the target NAS 1200 in the step 5650 and the control jumps to the step 5610.

In the third embodiment, a description will be given for a case in which important files distributed in a plurality of NAS devices 1200 can be backed up at a time. Parts otherwise described are the same as those for the first embodiment.

Figure 17:
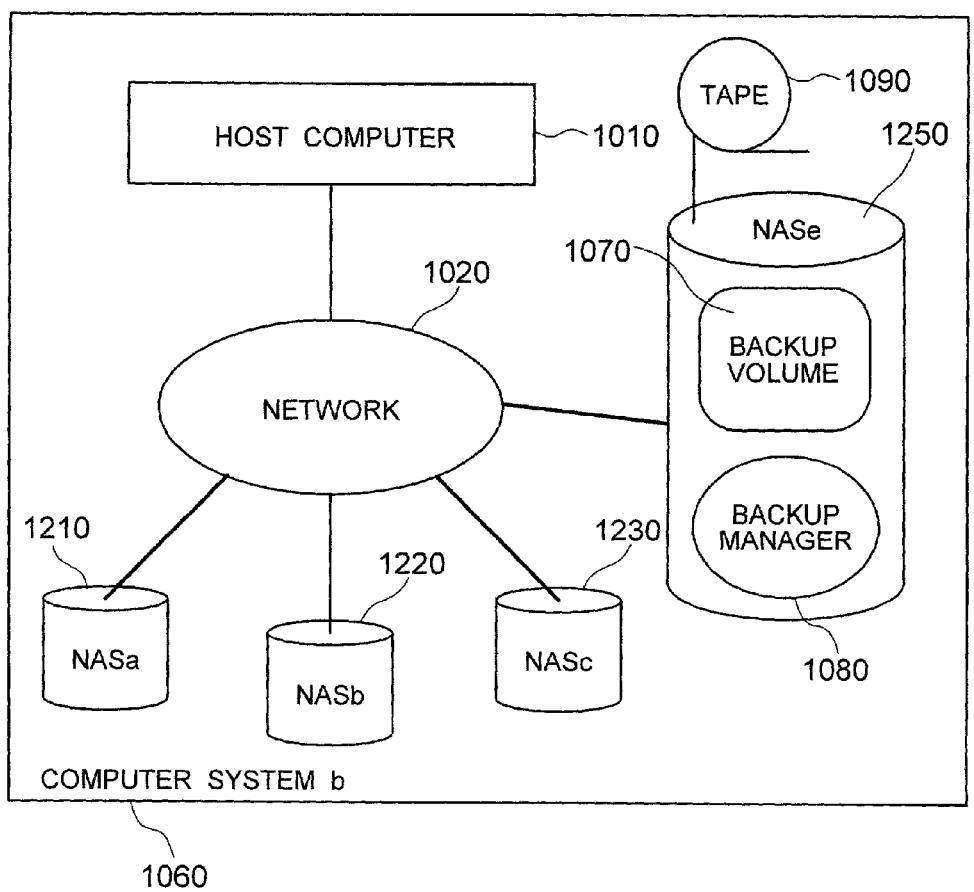
FIG. 17 is a computer system b according to a third embodiment.

Referring to FIG. 17, there is shown a computer system b 1060 according to the third embodiment.

The computer system b 1060 comprises a host computer 1010 for issuing file access requests, a plurality of NAS devices 1200 for processing file access requests issued by the host computer 1010; NASa 1210, NASb 1220, NASc 1230, and NASe 1250, a data backup tape drive 1090 connected to NASe 1250, and a network 1020 for connecting them. NASe 1250 contains a backup manager 1080 for performing a data backup process and a backup volume 1070 to be backed up. The backup manager 1080 is a program executed by the CPU 1110 of the NAS controller 1100. The directory corresponding to the backup volume 1070 is assumed to be represented by /bkup and its subdirectories.

Referring to FIG. 18, there is shown an example of the copy file table 1300 according to the third embodiment.

At entry number 0, the source NAS of remote copy 1320 is NASa 1210, the source directory of remote copy 1330 is /tako/ika.txt, the target NAS of remote copy 1340 is NASe 1250, and the target directory of remote copy 1350 is /bkup. At entry number 1, the source NAS of remote copy 1320 is NASb 1220, the source directory of remote copy 1330 is /foo/boo.c, the target NAS of remote copy 1340 is NASe 1250, and the target directory of remote copy 1350 is /bkup. At entry number 2, the source NAS of remote copy 1320 is NASc 1230, the source directory of remote copy 1330 is /important, the target NAS of remote copy 1340 is NASe 1250, and the target directory of remote copy 1350 is /bkup. At entry number 3 and after, value −1 is entered in the source NAS 1320, indicating an invalid entry.

In this manner, all of the remote copy destinations are collected in a single place, namely, the backup volume 1070 indicated by /bkup of NASe 1250 in this embodiment. To back up important files to be sources of remote copy at a time, the backup volume 1070 is backed up only.

Figure 19:
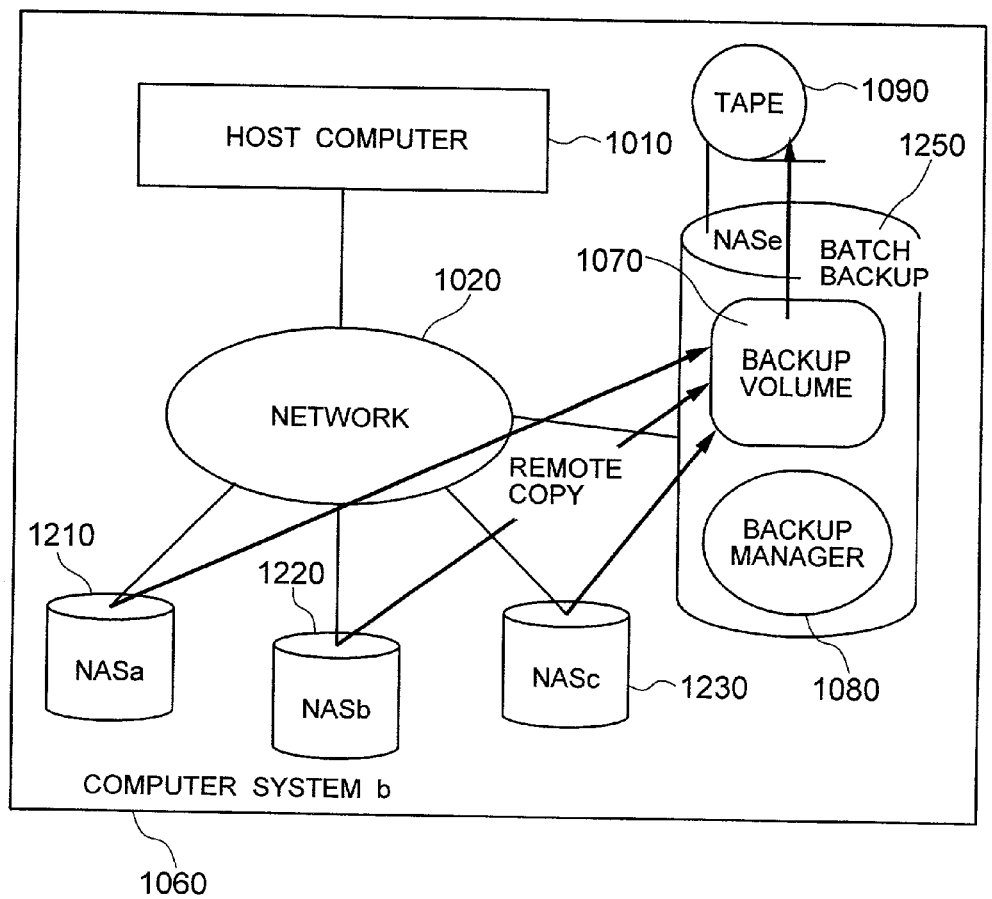
FIG. 19 is a diagram showing a data flow of remote copy and backup according to the third embodiment.

Referring to FIG. 19, there is shown remote copy and backup data flows according to this embodiment.

Remote copy from NASa 1210, NASb 1220, and NASc 1230 is executed to the backup volume of NASe 1250, and the backup manager 1080 backs up the backup volume 1070 into a tape at a time. In this manner, important files are collected in a single volume and then backed up, instead of backing up the important files distributed among the NAS devices 1200 individually, thereby saving a lot of time for the backup.

Figure 20:
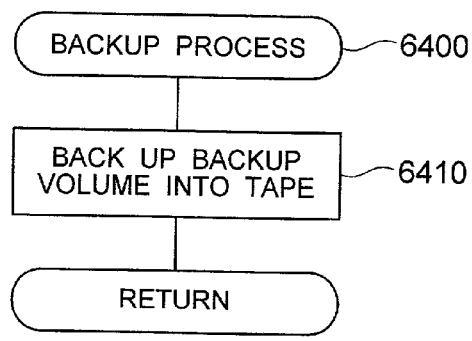
FIG. 20 is a flowchart of a backup process according to the third embodiment.

Referring to FIG. 20, there is shown a flowchart of the backup process 6400 executed by the backup manager 1080.

In step 6410, the backup manager 1080 backs up the backup volume 1070 into the tape 1090 and the backup process 6400 completes.

In the fourth embodiment, only points different from the first embodiment will be described by giving an example of using a dedicated network for remote copy between NAS devices. While disk controllers for remote copy are directly connected through ESCON or FC (fibre channel) lines for conventional remote copy at a block level in most cases, the NAS devices are connected through dedicated lines in the same configuration so as to be separated from a normal network to which the host computer and the NASs are connected.

Figure 21:
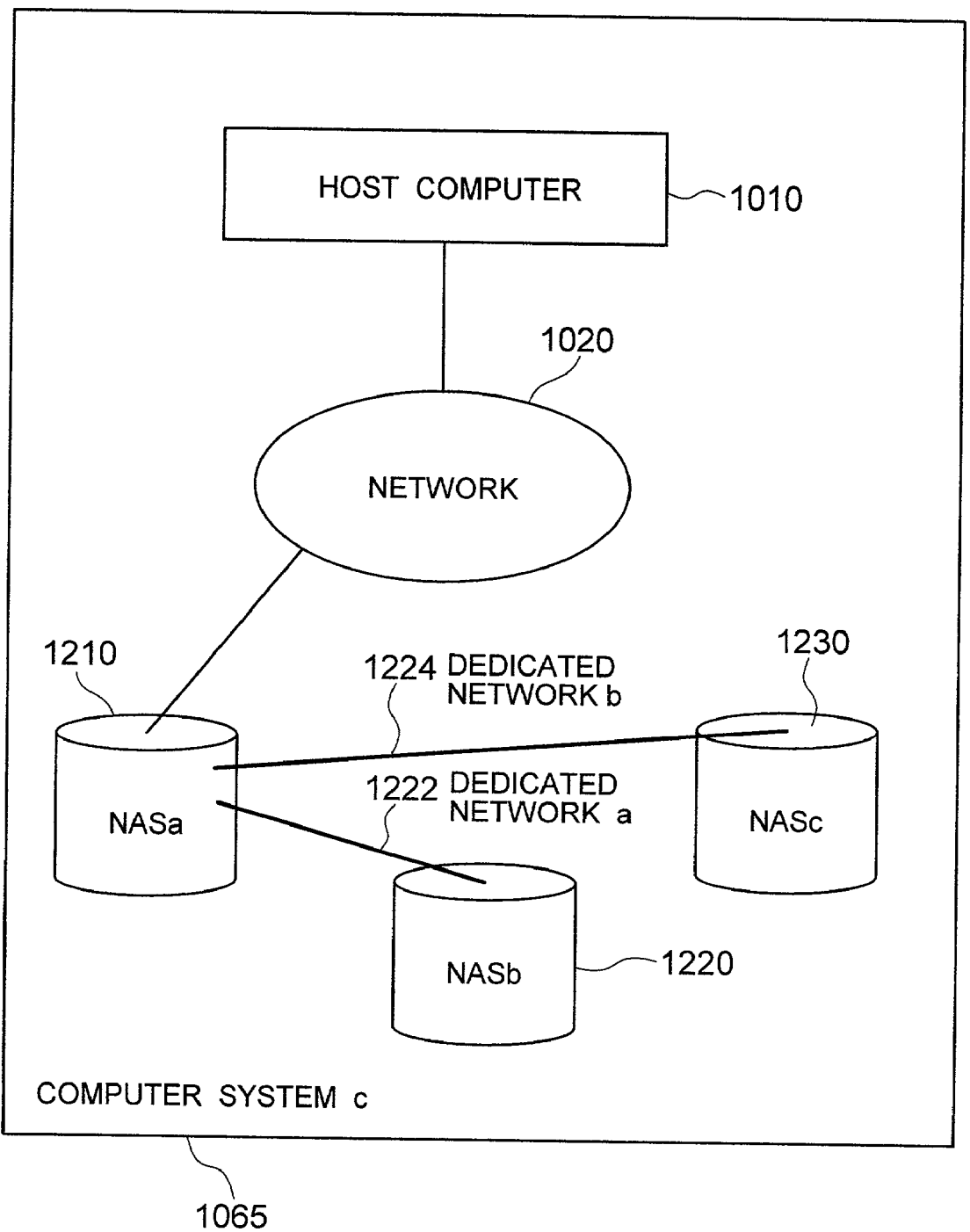
FIG. 21 is a diagram showing a computer system c according to a fourth embodiment.

Referring to FIG. 21, there is shown a configuration of a computer system c1065 according to this embodiment.

The computer system c1065 comprises a host computer 1010 for issuing a file access request, a plurality of NAS devices 1200 for processing the file access request issued by the host computer 1010; NASa 1210, NASb 1220, and NASc 1230, a network 1020 for connecting the host computer 1010 to NASa 1210, a dedicated network a 1222 for connecting NASa 1210 to NASb 1220, and a dedicated network b 1224 for connecting NASa 1210 to NASc 1230.

The network 1020 is an IP network using Ethernet or the like and is assumed to be shared among a lot of computers not shown in the diagram.

Both of the dedicated network a 1222 and the dedicated network b 1224 are assumed to be FC (fibre channel or it can be ESCON) lines and they are independent of the network 1020.

While the FC is normally used for a block I/O access using the FCP (fibre channel protocol) standard, a file access using the NFS or the like which assumes IP is enabled through FC by passing IP through FC using the IP and ARP over Fibre Channel (RFC 2625) settled by the IETF (Internet Engineering Task Force).

According to the present invention, a remote copy specification is realized in units of more detailed data such a file or a directory in the NAS.

What is claimed is:

1. A file level copy method in one or more storage systems connected to a computer via a network, comprising the steps of:

at a first storage system, receiving a write request from said computer to write a file;

writing said file in response to said write request;

in response to said write request and subsequent to writing said file, referring to a copy file table stored in said first storage system, said copy file table comprising plural source object entries, each source object entry including a source object identification and copy destination information associated with said source object identification, said copy destination information including identification of a target storage system and identification of a target directory in said target storage system; and if source object identification of one of said source object entries identifies said file or identifies a directory that contains said file, then copying said file to a target storage system associated with said source object identification, wherein the foregoing actions are performed for each write request, wherein if said file is copied to said target source, then sending a report to said computer indicative of completion of said write request, said report being sent after completion of said copying.

2. A computer system, comprising:

one or more storage systems; and a host computer coupled to at least one of said storage systems;

wherein each of said storage systems comprises a controller coupled to a host computer, a disk system coupled to said controller, and a copy file table, said copy file table comprising one or more source objects, and copy destination information for a target storage system and identification of a target directory in said target storage system that are associated with each of said source objects, wherein each of said storage systems accepts a write request to write a file and for each said write request, performs a write operation to service said write request and then, subsequent to said write operation, selectively executes a remote copy operation of said file to a target storage system accessible via said network, wherein said remote copy operation of said file is executed if said file is identified by one of said one or more source objects or if said file is under a directory identified by one of said one or more source objects, further comprising means for sending a report to said computer indicative of completion of said write request if execution of said remote copy operation occurs, said report being sent after completion of said remote copy operation.

3. A storage system comprising:

one or more disk devices for storing a plurality of files;

a copy file table comprising one or more source object entries, each source object entry being associated with a target storage system, wherein a source object entry identifies a file or a directory under which a plurality of files are contained; and a controller configured to respond to every received write request for a first file by performing a write operation on said first file stored in said storage system and by selectively performing, subsequent to said write operation, a copy operation of said first file from said storage system to a first target storage system, wherein said copy operation of said first file is performed if a first of said source objects identifies said first file or identifies a directory under which said first file is contained, wherein said first target storage system is associated with said first source object, wherein said controller is further configured to send a report to a computer indicative of completion of said write request if said copy operation is performed, said report being sent after completion of said copy operation.

* * * * *